(12) United States Patent
Redford et al.

(10) Patent No.: US 12,504,972 B1
(45) Date of Patent: Dec. 23, 2025

(54) STRIDE LENGTH PREDICATE CREATION

(71) Applicant: Analog Devices International Unlimited Company, Limerick (IE)

(72) Inventors: John L. Redford, Arlington, MA (US); Michael G. Perkins, Edinburgh (GB)

(73) Assignee: Analog Devices International Unlimited Company, Limerick (IE)

(*) Notice: Subject to any disclaimer, the term of this patent is extended or adjusted under 35 U.S.C. 154(b) by 0 days.

(21) Appl. No.: 18/752,518

(22) Filed: Jun. 24, 2024

(51) Int. Cl.
*G06F 9/30* (2018.01)

(52) U.S. Cl.
CPC ........ *G06F 9/30029* (2013.01); *G06F 9/3004* (2013.01)

(58) Field of Classification Search
None
See application file for complete search history.

(56) References Cited

U.S. PATENT DOCUMENTS

| | | | |
|---|---|---|---|
| 11,275,712 B2* | 3/2022 | Tschirhart | G06F 9/30021 |
| 12,204,487 B2* | 1/2025 | Koker | G06F 9/383 |
| 2012/0017067 A1* | 1/2012 | Sankaran | G06F 9/3822 712/205 |
| 2015/0370562 A1* | 12/2015 | Stark | G06F 9/30072 712/206 |
| 2016/0179538 A1* | 6/2016 | Collins | G06F 9/30072 712/202 |
| 2017/0192783 A1* | 7/2017 | Ould-Ahmed-Vall | G06F 9/30038 |
| 2018/0253310 A1* | 9/2018 | Stephens | G06F 11/073 |
| 2020/0371800 A1* | 11/2020 | Chirca | G06F 9/30094 |
| 2022/0035633 A1* | 2/2022 | Cain, III | G06F 9/30043 |

* cited by examiner

*Primary Examiner* — Eric Coleman
(74) *Attorney, Agent, or Firm* — Schwegman Lundberg & Woessner, P.A.

(57) ABSTRACT

System and techniques for creating a single-instruction multiple-data (SIMD) processor predicate based on stride length are described herein. When an instruction for a SIMD processor is received, and the instruction has a specified stride length, a predicate memory can be read to obtain a current predicate. A new predicate can be determined based on the stride length and the current predicate. The new predicate is written to the predicate memory. When an instance of the instruction is executed by the SIMD processor, the execution is performed on a subset of data loaded into the SIMD processor based on the new predicate read from the predicate memory.

20 Claims, 4 Drawing Sheets

STRIDE LENGTH PREDICATE CREATION

TECHNICAL FIELD

Embodiments described herein generally relate to single-instruction-multiple-data (SIMD) processor design and more specifically to stride length predicate creation.

BACKGROUND

A SIMD (Single Instruction, Multiple Data) processor is a type of microprocessor architecture that enables the execution of a single instruction on multiple data points simultaneously. This design is part of the broader data parallelism concept, where parallel computing is achieved by performing the same operation on a sequence of data distributed across different processing units. In a SIMD processor, multiple processing elements are equipped to carry out the same operation on different parts of an input data stream concurrently. This capability is particularly effective in scenarios involving large arrays or matrices, such as in image processing, scientific simulations, and multimedia applications, where the same process needs to be applied to a high volume of data elements. By synchronizing the instruction flow across various data points, SIMD processors optimize computational efficiency, reduce processing time, and increase throughput.

In SIMD architectures, managing interleaved data effectively can be complex due to the simultaneous processing of multiple data elements. Predicates offer a solution by enabling selective operation on data elements that meet specific conditions, enhancing control over data parallelism. A predicate in this context is a condition or set of conditions that determine whether a particular SIMD operation should be executed on each element of the data vector. This technique is particularly useful when dealing with interleaved data structures where operations might only be relevant to certain elements within a vector. For example, consider a vector containing interleaved data from different sensors, where different processing is applied to data from each sensor. By employing predicates, specific operations (such as scaling or filtering) are selectively applied to the relevant data points. This selective processing prevents the unnecessary processing of irrelevant data, which can lead to inefficiencies or erroneous outputs . . . . Consequently, predicates enhance the ability to handle complex, interleaved data structures more efficiently on SIMD processors by improving performance and reducing the likelihood of data handling errors.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
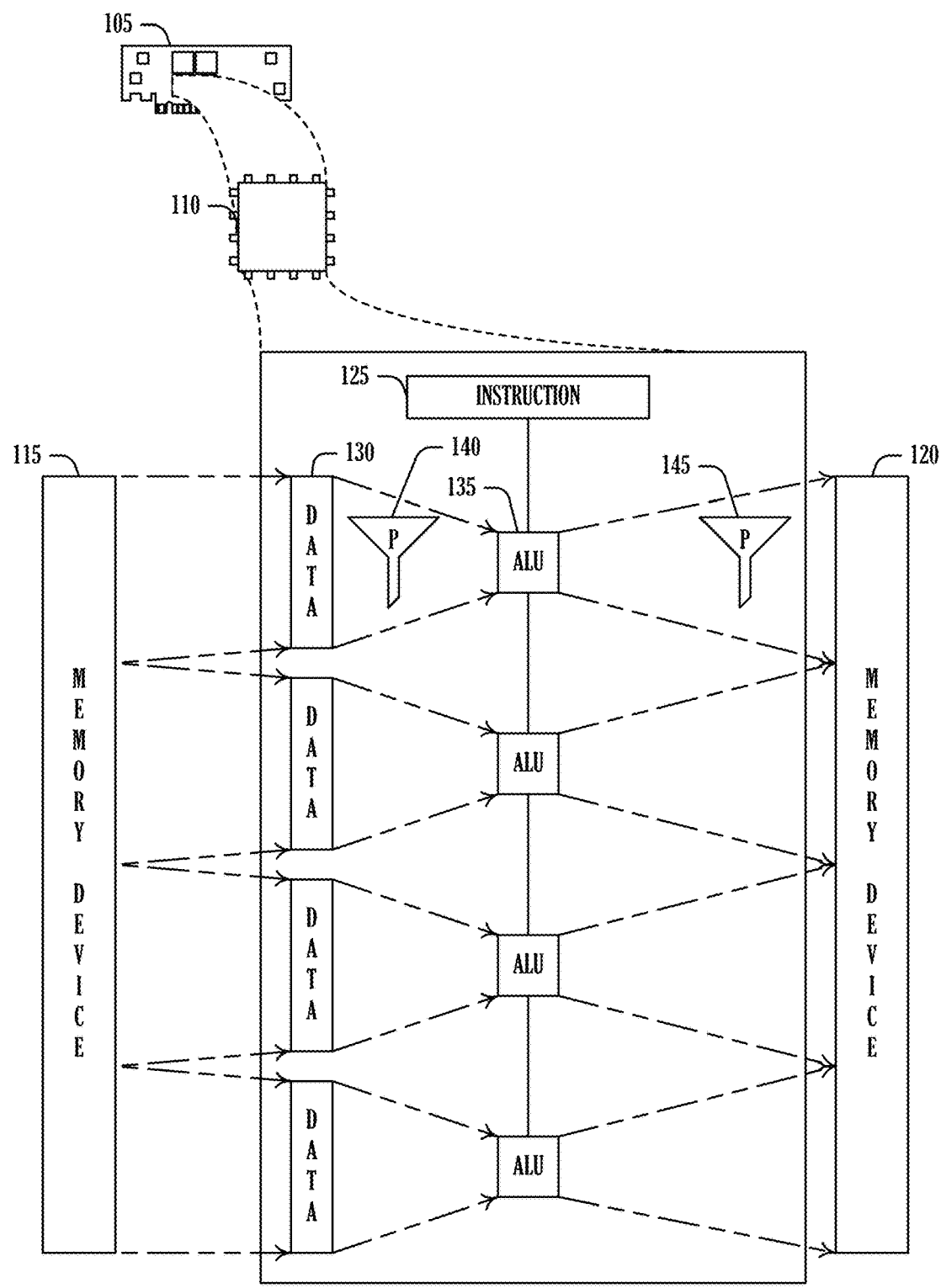
FIG. 1 is a block diagram of an example of an environment including a system for stride length predicate creation, according to an embodiment.

Processing routines can be designed to include a stride, or an address increment, within their parameters. This stride is crucial for handling data that is structured into several interleaved channels, as it allows the routines to selectively access elements from a specific channel while bypassing elements from others. Essentially, the stride facilitates the movement from one relevant element to the next within the same channel, effectively "stepping over" the elements of other channels. This capability is particularly useful in applications dealing with complex data structures. However, the use of strides introduces challenges when attempting to parallelize these routines on SIMD (Single Instruction, Multiple Data) processors. SIMD processors are inherently designed to efficiently process data that is contiguous in memory. They operate optimally when executing operations on data sequences located at consecutive memory addresses. When a stride is introduced, the data accessed by the SIMD processor is no longer contiguous. The processor could drop back to working on only one element at a time, but if the stride is less than the SIMD width, a single vector could still be used to do multiple elements, thus improving performance.

As discussed earlier, the use of predicates, such as lane enables, offers a solution to selectively process elements within a SIMD vector. Predicates can be particularly useful in scenarios where only specific elements of a vector need to be processed, leaving the rest unchanged. Typically, a predicate is implemented as a bitmap, where each bit corresponds to a lane in the SIMD processor. If a bit in the predicate bitmap is set to one, the corresponding lane is activated, and the operation is applied to that element. If the bit is set to zero, the operation skips that lane, leaving the element unchanged. This selective processing capability allows for greater flexibility and efficiency in data handling, especially in complex computational scenarios where not all data elements require processing.

Although predicates provide a powerful tool for managing the processing of interleaved data on SIMD processors, their implementation is not without cost. Generating these predicates can be computationally demanding, particularly when the stride varies among different data channels. If the stride is consistent, the predicate can be established based on a fixed stride length and an initial offset for the first object in the vector. However, if the stride varies, the predicate must be recalculated for each object within each channel. This necessity for frequent recalculations imposes a significant computational burden on the SIMD processor. Each channel processed may require a unique predicate, and these predicates must be recalculated for every new instruction execution. This intensive computation can lead to increased processing times, higher latencies, and greater consumption of processor resources, potentially offsetting the benefits of using SIMD processors. The challenge lies in balancing the computational overhead of predicate calculation with the performance gains from using SIMD processing capabilities.

To address the challenges associated with generating predicates, a method can be employed where predicates of sub-vector width are precalculated in sequences and subsequently applied to the current vector. For instance, predicates corresponding to various strides can be prepared in advance. An initial condition is utilized to commence at the start of this pre-determined sequence of predicates. As instruction processing progresses and additional vectors are introduced, the position of the predicate relative to the vector may shift. In such cases, the last used predicate informs the selection of the subsequent sequence of predicates. Therefore, rather than computing each predicate position for every vector throughout the execution of an instruction, this method leverages pre-established patterns based on the previously used pattern. This approach can be integrated into the SIMD processor either as an additional command within the instruction set or as a concurrent effect during the execution of an instruction. Further details and examples are elaborated below.

FIG. 1 is a block diagram of an example of an environment including a system 105 for stride length predicate creation, according to an embodiment. The system (e.g., a SIMD processor) includes processing circuitry 110. The processing circuitry 110 includes, or includes an interface to, the memory device 115 for data input and includes, or includes an interface to, the memory device 120 to store output (e.g., results). In an example, the memory device 115 and the memory device 120 can be the same memory device, such as working memory (e.g., random access memory (RAM)) included in the system 105 or present in a computer (e.g., host) to which the system 105 is connected. The processing circuitry 110 includes memory 130, such as a register file, to store a vector for processing by an abstract logic unit (ALU) 135 or other processing element included in the processing circuitry 110. The processing circuitry 110 also includes an instruction pipeline 125. Thus, the data is accessed in contiguous chunks from the memory device 115, vectorized in the memory 130 and provided as inputs to the ALU 135. The ALU 135, and the other ALUs, implement the instruction from the instruction pipeline 125 on respective vectors to produce results that are stored in the memory device 120.

The processing circuitry 110 also includes an input predicate device 140 and an output predicate device 145. Although both an input predicate device 140 and an output predicate device 145 are illustrated, in an example, the processing circuitry 110 includes only the input predicate device 140 and does not include the output predicate device 145. The input predicate device 140 accepts a predicate and the vector (e.g., data) from the memory 130 as input. Lanes (e.g., portions) of the vector are enabled or disabled by the input predicate device 140 based on the predicate. The enabled lanes are processed by the ALU 135. The disabled lanes are not processed by the ALU 135. In an example, in not processing the disabled lanes, the ALU 135 passes the data from a disabled lane through to the memory device 120 unchanged.

As noted above, the creation of the predicate during any one execution of the instruction can be challenging in SIMD processors, such as the system 105. The creation of the predicate, based on a stride length provided in the instruction, can be implemented by the processing circuitry 110 (e.g., by the input predicate device 140 or another component) in a manner that reduces the computational complexity that exist in traditional systems. To this end, the processing circuitry 110 is configured to receive an instruction that includes a stride length. In an example, the memory 130 represents a fixed width of data lanes available for an instance of the instruction. Here, the instance of the instruction is any one run of the instruction on the ALU 135. However, several instances of the instruction can be run with different input data in the memory 130. In an example, the stride length is less than or equal to the width. This conditional example illustrates an environment in which the stride length predicate creation as discussed herein is most effective because the pattern of predicate values is constrained by the representations of the enabled channel in the vector.

The processing circuitry 110 is configured to read a predicate memory to obtain a current predicate. Here, the predicate memory can be a register file in the input predicate device 140, or elsewhere in the processing circuitry 110. In an example, the predicate memory holds an array of bits with a cardinality equal to a multiple of the width of data lanes available to an instance of the instruction. Thus, if the multiple is one, then the array has the same number of elements as the vector has lanes. Here, each element of the array corresponds to one exclusive subset of data lanes of the data lanes. In an example, the predicate memory is a set of registers (e.g., a register file). In an example, the set of registers is an input predicate register (e.g., used by the input predicate device 140). In an example, the processing circuitry 110 includes an output predicate register that controls (e.g., via the output predicate device) which outputs are written after the instance of the instruction is executed.

The processing circuitry 110 is configured to calculate a new predicate based on the stride length and the current predicate. As discussed below with respect to FIG. 2, there is often a pattern present for a given stride length and vector width. This pattern essentially acts as a precomputation of the predicate values when a starting position is given. The stride length thus identifies which pattern is relevant for a given interleaved channel, and the current predicate provides the identification of where in the pattern a given instance of instruction execution is found. For example, if the pattern oscillates between having has every even element of the predicate set and every odd element of the predicate set, starting at the first execution instance of the instruction, then knowing that the current predicate has every odd element set means that the new predicate will have every even element set. Generally, for the first execution, an initialization (e.g., the starting portion of the pattern) can be used as the new predicate when, for example, the current predicate is in a recognizable "initial" state, such as having all elements set to a logical zero. In an example, the predicate memory is initialized at the completion of the instruction or as part of loading the instruction.

In an example, the new predicate calculation is performed by dedicated circuitry of the processing circuitry 110. In an example, the calculation of the new predicate is as a side effect of executing an instance of the instruction. In this example, as the output is written to the memory device 120, the dedicated circuitry can write the new predicate to the input predicate memory in parallel. This arrangement provides a low-latency solution to predicate calculations at the cost of some hardware complexity of the processing circuitry 110. In an example, the calculation of the new predicate is a part of the instruction. Here, the instruction, serially, performs the new predicate calculation after the results are written, for example.

In an example, the calculation of the new predicate based on the stride length is based on a least significant bit of the current predicate. In this example, there are a limited number of valid new predicate values given the pattern established by the stride length and vector width. Here, the new predicate value is the next in the cycle (e.g., sequence) of this pattern and the current position in the sequence can be ascertained with only the least significant bit of the current predicate. Accordingly, in an example, calculating the new predicate based on the least significant bit of the current predicate includes determining which element of a cycle the current predicate represents based on the least significant bit and selecting a next element of the cycle for the new predicate.

The number of elements of the cycle can be known (e.g., precomputed, hardwired, etc.) with relation to the vector width and the stride length. In an example, the width of the data lanes is divisible by the stride length. In this example, the cycle has a length of one. Thus, the same predicate is used each time, or the current predicate and the new predicate are the same. In an example, the stride length is a prime number, and the cycle has a length equal to the stride length. In this example, if the string length is three, then there are three elements in the cycle. Accordingly, a fourth instance of the instruction execution has the same predicate at the first instance of the instruction execution, the second instance using a second predicate and the third instance using a third predicate. In an example, where the width is not divisible by the stride length and the stride length is not a prime number, the cycle has a length equal to a product of factors of the stride length. Generally, the width is divisible by two, such that a factor of two leads to a cycle length of one. Otherwise, the multiplication of prime factors results in the cycle length. Accordingly, a stride length of thirty can be factored into stride two (S2) multiplied by stride three (S3) multiplied by stride five (S5). Because the width is divisible by two, S2 is a one, resulting in a cycle length calculation of 1*3*5=15 when the stride length is thirty.

In an example, calculating the new predicate is also based on a remainder indicating how many data elements are left to process for the instruction. This example addresses a situation in which the interleaved channel has fewer elements in a last vector than in other vectors. For example, given a vector width of four lanes, and the interleaved channel is every other lane starting at the first lane, and the interleaved channel has five elements, the channel has elements in the first and third lane of the first instance of instruction execution, elements in the first and third lane of the second instance of the instruction execution, and only in the first lane of the third instance of the instruction execution. The third lane has other data and should not be processed. Thus, the final predicate of the cycle is truncated to fit the length of the interleaved channel. Accordingly, in an example, a remainder of less than a width of data lanes of the SIMD processor indicating that the data loaded into the SIMD processor for the instance of the instruction is a final load of data for the instruction. Here, if the remaining data is smaller than the width, the predicate will be truncated because this is the last predicate of the cycle. In an example, the remainder is decremented by the width based on the remainder being greater than the width after the data is loaded into the SIMD processor for the instance of the instruction. This last example illustrates that the total data length can be held upon the initial instruction load and decremented, by the width, as each instance of the instruction executes until it is less than the width. This provides an elegant technique to modify the last predicate of the predicate cycle to omit data that is not included in the channel.

The processing circuitry 110 is configured to write the new predicate into the predicate memory and execute an instance of the instruction on a subset of data loaded for the instance of the instruction. The subset of data refers to only those lanes of the vector that are enabled by the corresponding predicate values. Thus, the subset of data being operated upon by the ALU 135 is based on the new predicate read from the predicate memory. The cycle-based predicate creation enables the processing circuitry 110 to implement a variety of stride lengths with minimal additional processing overhead leading to a more efficient execution of interleaved data on SIMD architectures.

Figure 2:
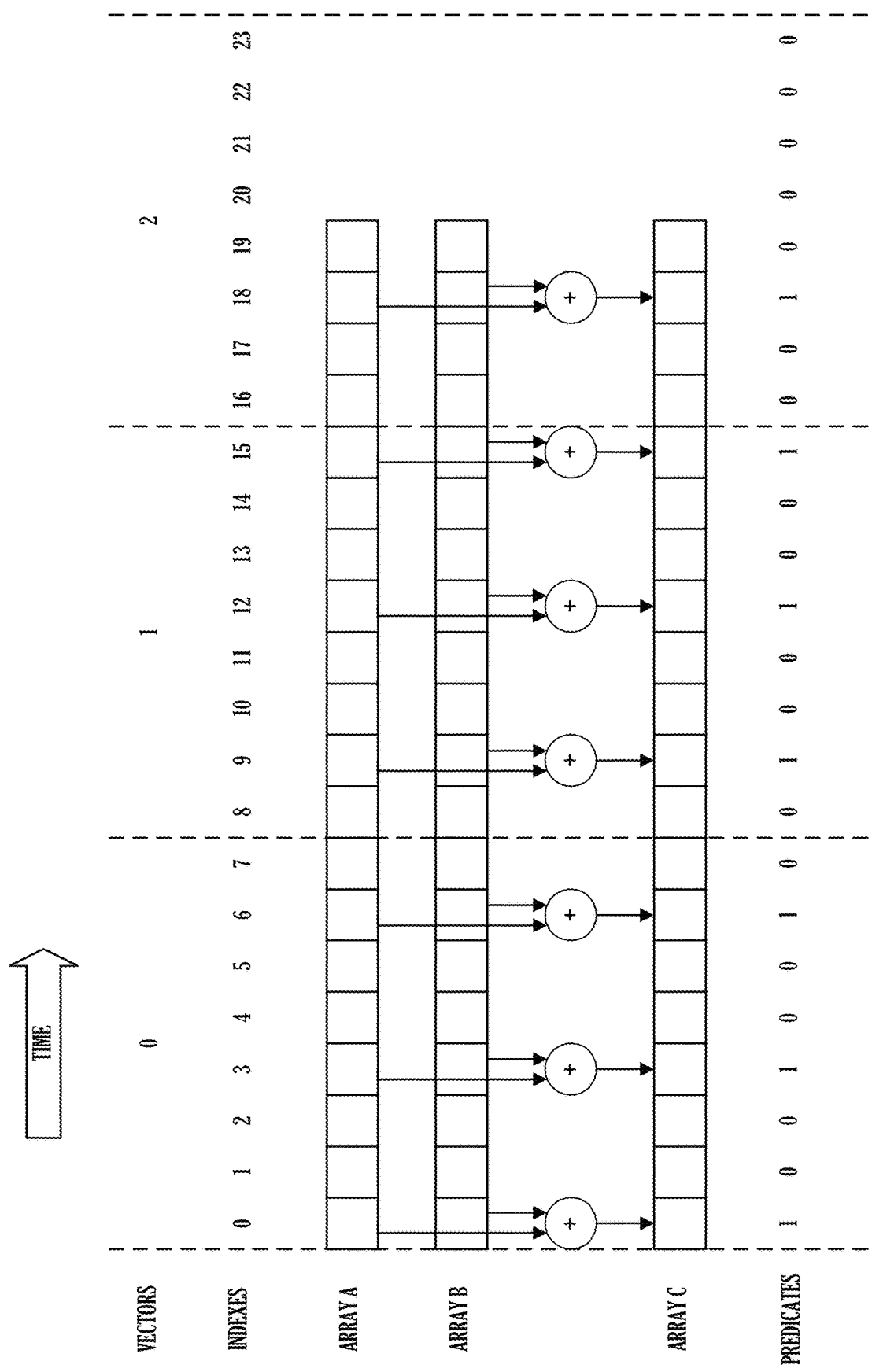
FIG. 2 illustrates an example of predicate change in time for a given stride length and vector size, according to an embodiment.

FIG. 2 illustrates an example of predicate change in time for a given stride length and vector size, according to an embodiment. Consider a routine that adds the Sth elements of two arrays (e.g., Array A and Array B) and writes the result to a third array (e.g., Array C), all of length N. Here, S is the stride. If the processor has a width W, then the processor can perform W adds at once. The write enables for the add are controlled by a W-bit predicate with one bit for each lane.

For S=3, N=20, and W=8 (as illustrated), the operation can be expressed as, a sum of every third element of Array A and Array B is written to Array C. To complete the operation, three sums can be performed on Vector 0, three on Vector 1, but only one sum can be completed on vector 2 because the arrays are out of data. The predicate is set to 0x49 on vector 0, 0x92 on vector 1, and just 0x4 on vector 2. Here, the predicate calculation handles the situation where the arrays at index nineteen and disables the rest of vector two. For S=3, the predicate for Vector 3 is the same as for Vector 0. Thus, the predicate pattern has a cycle length of 3. If S=1, 2, or 4, the predicate is always the same-0xff, 0x55, and 0x11 respectively. Accordingly, these stride lengths have a cycle length of one. In general, the cycle length C for a stride S is determined by:

1. C(S)=1 if S is a divisor of W (usually a power of 2); else
2. C(S)=S if S is prime; else
3. C(S)=product over i of C (Si) if S is composite and has factors S0, S1 . . . with cycle lengths C (S0), C (S1) . . . . E.g., C (6)=C (3)*C (2)=3*1=3

Here are the predicate cycles for a few values of W:

| Stride | W = 4 | W = 8 | W = 16 |
|---|---|---|---|
| 1 | 0 × f | 0 × ff | 0 × ffff |
| 2 | 0 × 5 | 0 × 55 | 0 × 5555 |
| 3 | 0 × 9, 0 × 4, 0 × 2 | 0 × 49, 0 × 92, 0 × 24 | 0 × 9249, 0 × 4924, 0 × 2492 |
| 4 | | 0 × 11 | 0 × 1111 |
| 5 | | 0 × 21, 0 × 84, 0 × 10, 0 × 42, 0 × 08 | 0 × 8421, 0 × 4210, 0 × 2108, 0 × 1084, 0 × 0842 |
| 6 | | 0 × 41, 0 × 10, 0 × 04, | 0 × 1041, 0 × 4104, 0 × 0410, |
| 7 | | 0 × 81, 0 × 40, 0 × 20, 0 × 10, 0 × 08, 0 × 04, 0 × 02 | 0 × 4081, 0 × 1020, 0 × 0408, 0 × 8102, 0 × 2040, 0 × 0810, 0 × 0204 |

-continued

| Stride | W = 4 | W = 8 | W = 16 |
|---|---|---|---|
| 8 | | | 0 × 0101 |
| 9 | | | 0 × 0201, 0 × 0804, 0 × 2010, 0 × 8040, 0 × 0100, 0 × 0402, 0 × 1008, 0 × 4020, 0 × 0080 |
| 10 | | | 0 × 0401, 0 × 4010, 0 × 0100, 0 × 1004, 0 × 0040 |
| 11 | | | 0 × 0801, 0 × 0040, 0 × 1002, 0 × 0080, 0 × 2004, 0 × 0100, 0 × 4008, 0 × 0200, 0 × 8010, 0 × 0400, 0 × 0020 |
| 12 | | | 0 × 1001, 0 × 0100, 0 × 0010 |
| 13 | | | 0 × 2001, 0 × 0400, 0 × 0080, 0 × 0010, 0 × 4002, 0 × 0800, 0 × 0100, 0 × 0020, 0 × 8004, 0 × 1000, 0 × 0200, 0 × 0040, 0 × 0008 |
| 14 | | | 0 × 4001, 0 × 1000, 0 × 0400, 0 × 0100, 0 × 0040, 0 × 0010, 0 × 0004 |
| 15 | | | 0 × 8001, 0 × 4000, 0 × 2000, 0 × 1000, 0 × 0800, 0 × 0400, 0 × 0200, 0 × 0100, 0 × 0080, 0 × 0040, 0 × 0020, 0 × 0010, 0 × 0008, 0 × 0004, 0 × 0002 |

The next predicate in the cycle can be determined (e.g., calculated) from only the stride length and the current predicate. For example, the position in the predicate cycle can be determined by finding the least significant logical one bit in the current predicate. For example, a hardware table lookup can use that position and the stride length to find the next. In an example, the circuitry can match the current predicate to produce the next. That is, the circuitry is hardwired to produce the next pattern as output given the predicate cycle position as input. In an example, the predicate can be initialized by inputting an all zeros predicate-which never occurs in any of the cycles-which the circuitry responds to by providing the predicate at the beginning of the predicate cycle.

As illustrated, the predicate for Vector 2 is truncated to handle the tail elements of Array A, Array B, and Array C. This feature is useful but not strictly necessary. In an example, the tail element handling can be accomplished a register R that is initialized to N and decremented by W every time a new predicate is calculated. If R is greater than or equal to W, the whole predicate is used, only the elements less than or equal to R can be enabled, masking off the non-relevant elements.

In an example, the creation of stride length predicates is limited to S<W. If S>=W, then only do one operation can be performed per vector, and the process of reading the current predicate to determine the new predicate results in extra reads. Accordingly, the technique may be slower than a purely scalar approach.

The following pseudo code provides an example implementation of the technique:

```
If S < W
    Remaining = N
    Predicate = get_stride_enable_W (0, S, Remaining)
    Loop ceiling (N, W) times
        Read input operands as vectors
        Read output operands as vectors
        Do operations on outputs from inputs using Predicate
        Predicate = get_stride_enable_W (Predicate, S, Remaining)
        Write outputs as vectors
    Loop end
Else
    Loop N/S times
```

-continued

```
        Read inputs as scalars and increment by S
        Do operations on outputs from inputs
        Write outputs as scalars and increment by S
```

In an example, an additional conditional can be used to govern which technique is used. Thus, if the stride is less than the width, use the technique above; else use a scalar technique. In an example, the predicate is initialized and then all the vectors that cover the array are looped over, reading the inputs and outputs, modifying the outputs according to the predicate, and then writing the outputs and updating the predicate.

As noted above, there are different ways in which to implement the technique in a processor. For example, the technique of predicate creation can be implemented as a set of standalone instructions implemented in circuitry of the processor, such as:

stride enable [4W, 2W, W, W2] output_enable, input enable, stride, remaining where [4W,2W,W,W2] is the width to be used, from four times the natural width to half the natural width. If the width W is the number of SIMD lanes for 32-bit data types, then 4W is for 8-bit, 2W 16-bit, and W2 is 64-bit.

output_enable [output] is an output predicate register and contains width bits.

input enable [input] is an input predicate register of width bits. If this is zero, the output_enable can be set to the first pattern of the cycle, otherwise it is used to calculate the next element.

stride [input] is the number of elements in an array from one to the next remaining [input/output] is a register holding the number of remaining elements in the array. This is decremented by the width when the instruction is executed.

The advantage of doing this as a processor instruction is the relative ease of add to existing instruction sets using existing register sets or ports.

In an example, the technique can be implemented as a side-effect of executing a predicated instruction. Generally, predicated instructions use a predicate register to specify which lanes to modify. Here, that register can be a dedicated register in the circuitry along with the stride register and the remaining registers. The predicated instructions implement an extra variant that updates the predicate and remaining values. This technique is switchable, to be disabled when, for example, several instructions are using the same predicate. An advantage to this arrangement, is the freeing of an instruction slot that would be used if the technique is implemented as standalone instructions.

In an example, instead of dedicated circuitry in the processor, for any particular stride, the cycle of predicates can be looked up in a table and loaded into a set of C predicate registers, where C is the cycle length. In this example, the array can be looped over, implementing C vectors per pass. In an example, instead of using the remaining register, the loop can stop before the last vector and create the predicate for the remaining elements in a scalar fashion. This approach can be effective for a few common strides without any hardware changes.

Figure 3:
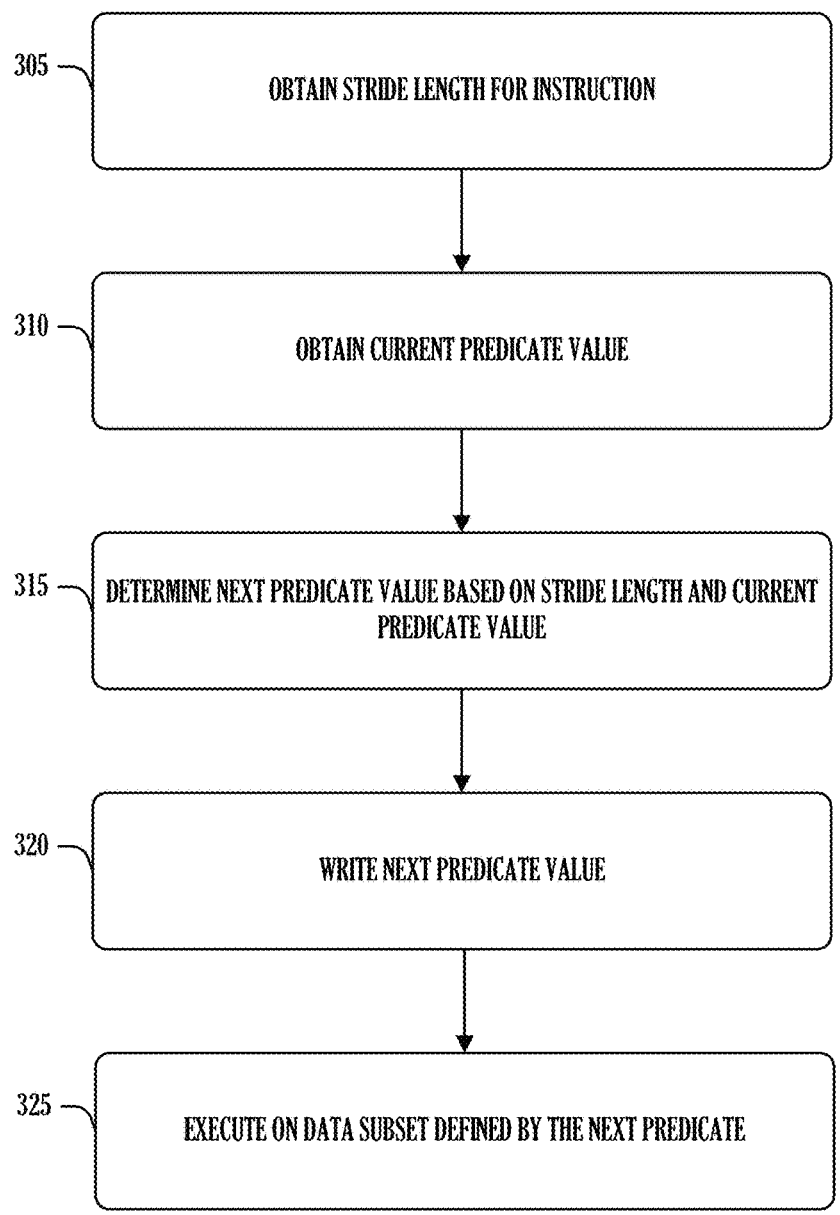
FIG. 3 illustrates a flow diagram of an example of a method for stride length predicate creation, according to an embodiment.

FIG. 3 illustrates a flow diagram of an example of a method 300 for stride length predicate creation, according to an embodiment. The operations of the method 300 are performed by computational hardware, such as that described above or below (e.g., processing circuitry).

At operation 305 an instruction for a SIMD processor is received. Here, the instruction includes a stride length. In an example, the SIMD processor has a width of data lanes available for an instance of the instruction. In an example, the stride length is less than or equal to the width.

At operation 310, a predicate memory is read to obtain a current predicate. In an example, the predicate memory holds an array of bits with a cardinality equal to a multiple of the width of data lanes available to an instance of the instruction. Here, each element of the array corresponds to one exclusive subset of data lanes of the data lanes. In an example, the predicate memory is initialized at the completion of the instruction or as part of loading the instruction.

In an example, the predicate memory is a set of registers. In an example, the set of registers is an input predicate register. In an example, the SIMD processor includes an output predicate register that controls which outputs are written after the instance of the instruction is executed.

At operation 315, a new predicate is calculated based on the stride length and the current predicate. In an example, calculating the new predicate is performed by circuitry of the SIMD processor as a side effect of executing an instance of the instruction.

In an example, the calculation of the new predicate based on the stride length is based on a least significant bit of the current predicate. In an example, calculating the new predicate based on the least significant bit of the current predicate includes determining which element of a cycle the current predicate represents based on the least significant bit and selecting a next element of the cycle for the new predicate. In an example, the width of the data lanes of the SIMD processor is divisible by the stride length, and wherein the cycle has a length of one. In an example, the stride length is a prime number, and the cycle has a length equal to the stride length. In an example, the cycle has a length equal to a product of factors of the stride length.

In an example, calculating the new predicate is also based on a remainder indicating how many data elements are left to process for the instruction. In an example, a remainder of less than a width of data lanes of the SIMD processor indicating that the data loaded into the SIMD processor for the instance of the instruction is a final load of data for the instruction. In an example, additional data lanes with data that does not correspond with the instruction are excluded from the subset of data outputted (e.g., operation 325) based on the remainder being less than the width of the SIMD processor. In an example, the remainder is decremented by the width based on the remainder being greater than the width after the data is loaded into the SIMD processor for the instance of the instruction.

At operation 320, the new predicate is written to the predicate memory.

At operation 325, an instance of the instruction is executed on a subset of data loaded into the SIMD processor for the instance of the instruction. This subset of data is based on the new predicate read from the predicate memory. In an example, to base the subset of data on the new predicate means that a subset of data lanes is included in the subset of data based on a logical one being in an element of the array that corresponds to the subset of data lanes and other data loaded into the SIMD processor is not in the subset of data otherwise.

Figure 4:
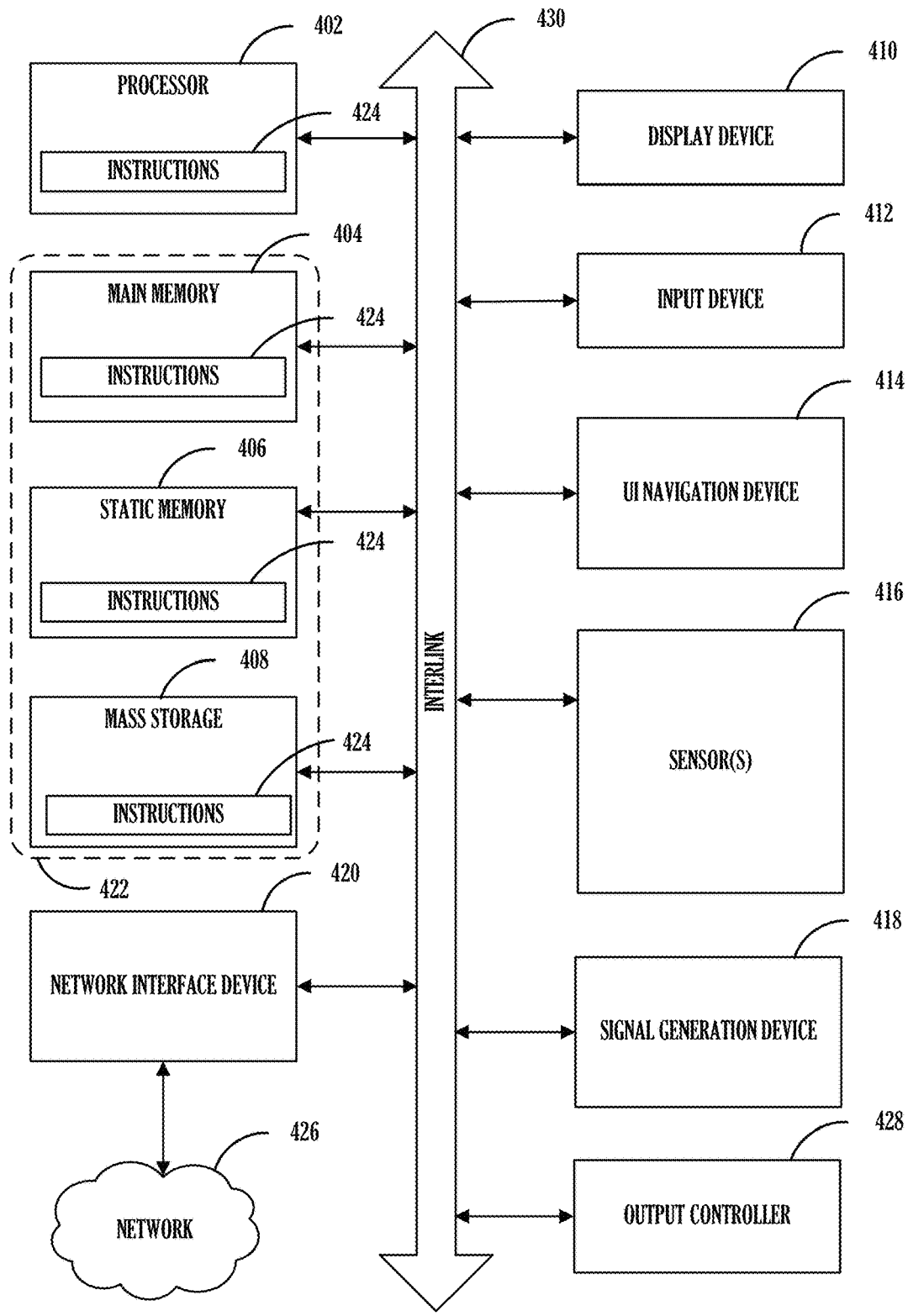
FIG. 4 is a block diagram illustrating an example of a machine upon which one or more embodiments may be implemented.

FIG. 4 illustrates a block diagram of an example machine 400 upon which any one or more of the techniques (e.g., methodologies) discussed herein may perform. Examples, as described herein, may include, or may operate by, logic or a number of components, or mechanisms in the machine 400. Circuitry (e.g., processing circuitry) is a collection of circuits implemented in tangible entities of the machine 400 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 400 follow.

In alternative embodiments, the machine 400 may operate as a standalone device or may be connected (e.g., networked) to other machines. In a networked deployment, the machine 400 may operate in the capacity of a server machine, a client machine, or both in server-client network environments. In an example, the machine 400 may act as a peer machine in peer-to-peer (P2P) (or other distributed) network environment. The machine 400 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 400 may include a hardware processor 402 (e.g., a central processing unit (CPU), a graphics processing unit (GPU), a hardware processor core, or any combination thereof), a main memory 404, a static memory (e.g., memory or storage for firmware, microcode, a basic-input-output (BIOS), unified extensible firmware interface (UEFI), etc.) 406, and mass storage 408 (e.g., hard drives, tape drives, flash storage, or other block devices) some or all of which may communicate with each other via an interlink (e.g., bus) 430. The machine 400 may further include a display unit 410, an alphanumeric input device 412 (e.g., a keyboard), and a user interface (UI) navigation device 414 (e.g., a mouse). In an example, the display unit 410, input device 412 and UI navigation device 414 may be a touch screen display. The machine 400 may additionally include a storage device (e.g., drive unit) 408, a signal generation device 418 (e.g., a speaker), a network interface device 420, and one or more sensors 416, such as a global positioning system (GPS) sensor, compass, accelerometer, or other sensor. The machine 400 may include an output controller 428, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 402, the main memory 404, the static memory 406, or the mass storage 408 may be, or include, a machine readable medium 422 on which is stored one or more sets of data structures or instructions 424 (e.g., software) embodying or utilized by any one or more of the techniques or functions described herein. The instructions 424 may also reside, completely or at least partially, within any of registers of the processor 402, the main memory 404, the static memory 406, or the mass storage 408 during execution thereof by the machine 400. In an example, one or any combination of the hardware processor 402, the main memory 404, the static memory 406, or the mass storage 408 may constitute the machine readable media 422. While the machine readable medium 422 is illustrated as a single medium, the term "machine readable medium" may include a single medium or multiple media (e.g., a centralized or distributed database, and/or associated caches and servers) configured to store the one or more instructions 424.

The term "machine readable medium" may include any medium that is capable of storing, encoding, or carrying instructions for execution by the machine 400 and that cause the machine 400 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

In an example, information stored or otherwise provided on the machine readable medium 422 may be representative of the instructions 424, such as instructions 424 themselves or a format from which the instructions 424 may be derived. This format from which the instructions 424 may be derived may include source code, encoded instructions (e.g., in compressed or encrypted form), packaged instructions (e.g., split into multiple packages), or the like. The information representative of the instructions 424 in the machine readable medium 422 may be processed by processing circuitry into the instructions to implement any of the operations discussed herein. For example, deriving the instructions 424 from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 424.

In an example, the derivation of the instructions 424 may include assembly, compilation, or interpretation of the information (e.g., by the processing circuitry) to create the instructions 424 from some intermediate or preprocessed format provided by the machine readable medium 422. The information, when provided in multiple parts, may be combined, unpacked, and modified to create the instructions 424. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 424 may be further transmitted or received over a communications network 426 using a transmission medium via the network interface device 420 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), LoRa/LoRaWAN, or satellite communication networks, mobile telephone networks (e.g., cellular networks such as those complying with 3G, 4G LTE/LTE-A, or 5G standards), Plain Old Telephone (POTS) networks, and wireless data networks (e.g., Institute of Electrical and Electronics Engineers (IEEE) 802.11 family of standards known as Wi-Fi®, IEEE 802.15.4 family of standards, peer-to-peer (P2P) networks, among others. In an example, the network interface device 420 may include one or more physical jacks (e.g., Ethernet, coaxial, or phone jacks) or one or more antennas to connect to the communications network 426. In an example, the network interface device 420 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 400, and includes digital or analog communications signals or other intangible medium to facilitate communication of such software. A transmission medium is a machine readable medium.

ADDITIONAL NOTES & EXAMPLES

Example 1 is a device for stride length predicate creation in a single-instruction multiple-data (SIMD) processor, the device comprising: a predicate memory; and processing circuitry that, when in operation, is configured to: receive an instruction including a stride length; read the predicate memory to obtain a current predicate; calculate a new predicate based on the stride length and the current predicate; write the new predicate to the predicate memory; and execute an instance of the instruction on a subset of data loaded into the SIMD processor for the instance of the instruction, the subset of data based on the new predicate read from the predicate memory.

In Example 2, the subject matter of Example 1, wherein the SIMD processor has a width of data lanes available for the instance of the instruction.

In Example 3, the subject matter of Example 2, wherein the predicate memory is configured to hold an array of bits with a cardinality equal to the width, each element of the array corresponding to one exclusive subset of data lanes of the data lanes.

In Example 4, the subject matter of Example 3, wherein, to base the subset of data on the new predicate, the processing circuitry is configured to include data of a subset of data lanes of the data in the subset of data based on a logical one being in an element of the array that corresponds to the subset of data lanes and other data loaded into the SIMD processor is not in the subset of data otherwise.

In Example 5, the subject matter of any of Examples 2-4, wherein the stride length is less than or equal to the width.

In Example 6, the subject matter of any of Examples 1-5, wherein the processing circuitry is configured to initialize the predicate memory at completion of the instruction or as part of loading the instruction.

In Example 7, the subject matter of any of Examples 1-6, wherein the processing circuitry is configured to calculate the new predicate based on the stride length by referring to a least significant bit of the current predicate.

In Example 8, the subject matter of Example 7, wherein, to calculate the new predicate based on the least significant bit of the current predicate, the processing circuitry is configured to: determine which element of a cycle the current predicate represents based on the least significant bit; and select a next element of the cycle for the new predicate.

In Example 9, the subject matter of Example 8, wherein a width of data lanes of the SIMD processor is divisible by the stride length, and wherein the cycle has a length of one.

In Example 10, the subject matter of any of Examples 8-9, wherein the stride length is a prime number, and wherein the cycle has a length equal to the stride length.

In Example 11, the subject matter of any of Examples 8-10, wherein the cycle has a length equal to a product of factors of the stride length.

In Example 12, the subject matter of any of Examples 1-11, wherein the processing circuitry is configured to calculate the new predicate as a side effect of executing the instance of the instruction.

In Example 13, the subject matter of any of Examples 1-12, wherein the processing circuitry is configured to calculate the new predicate based on a remainder indicating how many data elements are left to process for the instruction, a remainder of less than a width of data lanes of the SIMD processor indicating that data loaded into the SIMD processor for the instance of the instruction is a final load of data for the instruction.

In Example 14, the subject matter of Example 13, wherein additional data lanes with data that does not correspond with the instruction are excluded from the subset of data based on the remainder being less than the width of the SIMD processor.

In Example 15, the subject matter of any of Examples 13-14, wherein the processing circuitry is configured to decrement the remainder by the width based on the remainder being greater than the width after the data is loaded into the SIMD processor for the instance of the instruction.

In Example 16, the subject matter of any of Examples 1-15, wherein the predicate memory is a set of registers.

In Example 17, the subject matter of Example 16, wherein the set of registers is an input predicate register.

In Example 18, the subject matter of Example 17, comprising an output predicate register that controls which outputs are written after the instance of the instruction is executed.

Example 19 is a method for stride length predicate creation, the method comprising: receiving an instruction for a single-instruction multiple-data (SIMD) processor, the instruction including a stride length; reading a predicate memory to obtain a current predicate; calculating a new predicate based on the stride length and the current predicate; writing the new predicate to the predicate memory; and executing, by the SIMD processor, an instance of the instruction on a subset of data loaded into the SIMD processor for the instance of the instruction, the subset of data based on the new predicate read from the predicate memory.

In Example 20, the subject matter of Example 19, wherein the SIMD processor has a width of data lanes available for the instance of the instruction.

In Example 21, the subject matter of Example 20, wherein the predicate memory holds an array of bits with a cardinality equal to the width, each element of the array corresponding to one exclusive subset of data lanes of the data lanes.

In Example 22, the subject matter of Example 21, wherein, to base the subset of data on the new predicate, data of a subset of data lanes of the data is included in the subset of data based on a logical one being in an element of the array that corresponds to the subset of data lanes and other data loaded into the SIMD processor is not in the subset of data otherwise.

In Example 23, the subject matter of any of Examples 20-22, wherein the stride length is less than or equal to the width.

In Example 24, the subject matter of any of Examples 19-23, comprising initializing the predicate memory at completion of the instruction or as part of loading the instruction.

In Example 25, the subject matter of any of Examples 19-24, wherein calculating the new predicate based on the stride length is based on a least significant bit of the current predicate.

In Example 26, the subject matter of Example 25, wherein calculating the new predicate based on the least significant bit of the current predicate includes determining which element of a cycle the current predicate represents based on the least significant bit and selecting a next element of the cycle for the new predicate.

In Example 27, the subject matter of Example 26, wherein a width of data lanes of the SIMD processor is divisible by the stride length, and wherein the cycle has a length of one.

In Example 28, the subject matter of any of Examples 26-27, wherein the stride length is a prime number, and wherein the cycle has a length equal to the stride length.

In Example 29, the subject matter of any of Examples 26-28, wherein the cycle has a length equal to a product of factors of the stride length.

In Example 30, the subject matter of any of Examples 19-29, wherein calculating the new predicate is performed by circuitry of the SIMD processor as a side effect of executing the instance of the instruction.

In Example 31, the subject matter of any of Examples 19-30, wherein calculating the new predicate is also based on a remainder indicating how many data elements are left to process for the instruction, a remainder of less than a width of data lanes of the SIMD processor indicating that data loaded into the SIMD processor for the instance of the instruction is a final load of data for the instruction.

In Example 32, the subject matter of Example 31, wherein additional data lanes with data that does not correspond with the instruction are excluded from the subset of data based on the remainder being less than the width of the SIMD processor.

In Example 33, the subject matter of any of Examples 31-32, comprising decrementing the remainder by the width based on the remainder being greater than the width after the data is loaded into the SIMD processor for the instance of the instruction.

In Example 34, the subject matter of any of Examples 19-33, wherein the predicate memory is a set of registers.

In Example 35, the subject matter of Example 34, wherein the set of registers is an input predicate register.

In Example 36, the subject matter of Example 35, wherein the SIMD processor includes an output predicate register that controls which outputs are written after the instance of the instruction is executed.

Example 37 is a machine readable medium including instructions for stride length predicate creation, the instructions, when executed by processing circuitry, cause the processing circuitry to perform operations comprising: receiving an instruction for a single-instruction multiple-data (SIMD) processor, the instruction including a stride length; reading a predicate memory to obtain a current predicate; calculating a new predicate based on the stride length and the current predicate; writing the new predicate to the predicate memory; and executing, by the SIMD processor, an instance of the instruction on a subset of data loaded into the SIMD processor for the instance of the instruction, the subset of data based on the new predicate read from the predicate memory.

In Example 38, the subject matter of Example 37, wherein the SIMD processor has a width of data lanes available for the instance of the instruction.

In Example 39, the subject matter of Example 38, wherein the predicate memory holds an array of bits with a cardinality equal to the width, each element of the array corresponding to one exclusive subset of data lanes of the data lanes.

In Example 40, the subject matter of Example 39, wherein, to base the subset of data on the new predicate, data of a subset of data lanes of the data is included in the subset of data based on a logical one being in an element of the array that corresponds to the subset of data lanes and other data loaded into the SIMD processor is not in the subset of data otherwise.

In Example 41, the subject matter of any of Examples 38-40, wherein the stride length is less than or equal to the width.

In Example 42, the subject matter of any of Examples 37-41, wherein the operations comprise initializing the predicate memory at completion of the instruction or as part of loading the instruction.

In Example 43, the subject matter of any of Examples 37-42, wherein calculating the new predicate based on the stride length is based on a least significant bit of the current predicate.

In Example 44, the subject matter of Example 43, wherein calculating the new predicate based on the least significant bit of the current predicate includes determining which element of a cycle the current predicate represents based on the least significant bit and selecting a next element of the cycle for the new predicate.

In Example 45, the subject matter of Example 44, wherein a width of data lanes of the SIMD processor is divisible by the stride length, and wherein the cycle has a length of one.

In Example 46, the subject matter of any of Examples 44-45, wherein the stride length is a prime number, and wherein the cycle has a length equal to the stride length.

In Example 47, the subject matter of any of Examples 44-46, wherein the cycle has a length equal to a product of factors of the stride length.

In Example 48, the subject matter of any of Examples 37-47, wherein calculating the new predicate is performed by circuitry of the SIMD processor as a side effect of executing the instance of the instruction.

In Example 49, the subject matter of any of Examples 37-48, wherein calculating the new predicate is also based on a remainder indicating how many data elements are left to process for the instruction, a remainder of less than a width of data lanes of the SIMD processor indicating that data loaded into the SIMD processor for the instance of the instruction is a final load of data for the instruction.

In Example 50, the subject matter of Example 49, wherein additional data lanes with data that does not correspond with the instruction are excluded from the subset of data based on the remainder being less than the width of the SIMD processor.

In Example 51, the subject matter of any of Examples 49-50, wherein the operations comprise decrementing the remainder by the width based on the remainder being greater than the width after the data is loaded into the SIMD processor for the instance of the instruction.

In Example 52, the subject matter of any of Examples 37-51, wherein the predicate memory is a set of registers.

In Example 53, the subject matter of Example 52, wherein the set of registers is an input predicate register.

In Example 54, the subject matter of Example 53, wherein the SIMD processor includes an output predicate register that controls which outputs are written after the instance of the instruction is executed.

Example 55 is a system for stride length predicate creation, the system comprising: means for receiving an instruction for a single-instruction multiple-data (SIMD) processor, the instruction including a stride length; means for reading a predicate memory to obtain a current predicate; means for calculating a new predicate based on the stride length and the current predicate; means for writing the new predicate to the predicate memory; and means for executing, by the SIMD processor, an instance of the instruction on a subset of data loaded into the SIMD processor for the instance of the instruction, the subset of data based on the new predicate read from the predicate memory.

In Example 56, the subject matter of Example 55, wherein the SIMD processor has a width of data lanes available for the instance of the instruction.

In Example 57, the subject matter of Example 56, wherein the predicate memory holds an array of bits with a cardinality equal to the width, each element of the array corresponding to one exclusive subset of data lanes of the data lanes.

In Example 58, the subject matter of Example 57, wherein, to base the subset of data on the new predicate, data of a subset of data lanes of the data is included in the subset of data based on a logical one being in an element of the array that corresponds to the subset of data lanes and other data loaded into the SIMD processor is not in the subset of data otherwise.

In Example 59, the subject matter of any of Examples 56-58, wherein the stride length is less than or equal to the width.

In Example 60, the subject matter of any of Examples 55-59, comprising means for initializing the predicate memory at completion of the instruction or as part of loading the instruction.

In Example 61, the subject matter of any of Examples 55-60, wherein the means for calculating the new predicate based on the stride length is based on a least significant bit of the current predicate.

In Example 62, the subject matter of Example 61, wherein the means for calculating the new predicate based on the least significant bit of the current predicate include means for determining which element of a cycle the current predicate represents based on the least significant bit and selecting a next element of the cycle for the new predicate.

In Example 63, the subject matter of Example 62, wherein a width of data lanes of the SIMD processor is divisible by the stride length, and wherein the cycle has a length of one.

In Example 64, the subject matter of any of Examples 62-63, wherein the stride length is a prime number, and wherein the cycle has a length equal to the stride length.

In Example 65, the subject matter of any of Examples 62-64, wherein the cycle has a length equal to a product of factors of the stride length.

In Example 66, the subject matter of any of Examples 55-65, wherein the means for calculating the new predicate is included in circuitry of the SIMD processor as a side effect of executing the instance of the instruction.

In Example 67, the subject matter of any of Examples 55-66, wherein the means for calculating the new predicate is also based on a remainder indicating how many data elements are left to process for the instruction, a remainder of less than a width of data lanes of the SIMD processor indicating that data loaded into the SIMD processor for the instance of the instruction is a final load of data for the instruction.

In Example 68, the subject matter of Example 67, wherein additional data lanes with data that does not correspond with the instruction are excluded from the subset of data based on the remainder being less than the width of the SIMD processor.

In Example 69, the subject matter of any of Examples 67-68, comprising means for decrementing the remainder by the width based on the remainder being greater than the width after the data is loaded into the SIMD processor for the instance of the instruction.

In Example 70, the subject matter of any of Examples 55-69, wherein the predicate memory is a set of registers.

In Example 71, the subject matter of Example 70, wherein the set of registers is an input predicate register.

In Example 72, the subject matter of Example 71, wherein the SIMD processor includes an output predicate register that controls which outputs are written after the instance of the instruction is executed.

PNUM Example 73 is at least one machine-readable medium including instructions that, when executed by processing circuitry, cause the processing circuitry to perform operations to implement of any of Examples 1-72.

PNUM Example 74 is an apparatus comprising means to implement of any of Examples 1-72.

PNUM Example 75 is a system to implement of any of Examples 1-72.

PNUM Example 76 is a method to implement of any of Examples 1-72.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

The invention claimed is:

1. A device for stride length predicate creation in a single-instruction multiple-data (SIMD) processor, the device comprising:
   a predicate memory; and
   processing circuitry that, when in operation, is configured to:
      receive an instruction including a stride length;
      read the predicate memory to obtain a current predicate;
      calculate a new predicate based on the stride length and the current predicate;
      write the new predicate to the predicate memory; and
      execute an instance of the instruction on a subset of data loaded into the SIMD processor for the instance of the instruction, the subset of data based on the new predicate read from the predicate memory.

2. The device of claim 1, wherein the processing circuitry is configured to calculate the new predicate based on the stride length by referring to a least significant bit of the current predicate.

3. The device of claim 2, wherein, to calculate the new predicate based on the least significant bit of the current predicate, the processing circuitry is configured to:
   determine which element of a cycle the current predicate represents based on the least significant bit; and
   select a next element of the cycle for the new predicate.

4. The device of claim 3, wherein a width of data lanes of the SIMD processor is divisible by the stride length, and wherein the cycle has a length of one.

5. The device of claim 3, wherein the stride length is a prime number, and wherein the cycle has a length equal to the stride length.

6. The device of claim 3, wherein the cycle has a length equal to a product of factors of the stride length.

7. The device of claim 1, wherein the processing circuitry is configured to calculate the new predicate as a side effect of executing the instance of the instruction.

8. A method for stride length predicate creation, the method comprising:
   receiving an instruction for a single-instruction multiple-data (SIMD) processor, the instruction including a stride length;
   reading a predicate memory to obtain a current predicate;
   calculating a new predicate based on the stride length and the current predicate;
   writing the new predicate to the predicate memory; and
   executing, by the SIMD processor, an instance of the instruction on a subset of data loaded into the SIMD processor for the instance of the instruction, the subset of data based on the new predicate read from the predicate memory.

9. The method of claim 8, wherein calculating the new predicate based on the stride length is based on a least significant bit of the current predicate.

10. The method of claim 9, wherein calculating the new predicate based on the least significant bit of the current predicate includes determining which element of a cycle the current predicate represents based on the least significant bit and selecting a next element of the cycle for the new predicate.

11. The method of claim 10, wherein a width of data lanes of the SIMD processor is divisible by the stride length, and wherein the cycle has a length of one.

12. The method of claim 10, wherein the stride length is a prime number, and wherein the cycle has a length equal to the stride length.

13. The method of claim 10, wherein the cycle has a length equal to a product of factors of the stride length.

14. A non-transitory machine readable medium including instructions for stride length predicate creation, the instructions, when executed by processing circuitry, cause the processing circuitry to perform operations comprising:
   receiving an instruction for a single-instruction multiple-data (SIMD) processor, the instruction including a stride length;
   reading a predicate memory to obtain a current predicate;
   calculating a new predicate based on the stride length and the current predicate;
   writing the new predicate to the predicate memory; and
   executing, by the SIMD processor, an instance of the instruction on a subset of data loaded into the SIMD processor for the instance of the instruction, the subset of data based on the new predicate read from the predicate memory.

15. The non-transitory machine readable medium of claim 14, wherein calculating the new predicate based on the stride length is based on a least significant bit of the current predicate.

16. The non-transitory machine readable medium of claim 15, wherein calculating the new predicate based on the least significant bit of the current predicate includes determining which element of a cycle the current predicate represents based on the least significant bit and selecting a next element of the cycle for the new predicate.

17. The non-transitory machine readable medium of claim 16, wherein a width of data lanes of the SIMD processor is divisible by the stride length, and wherein the cycle has a length of one.

18. The non-transitory machine readable medium of claim 16, wherein the stride length is a prime number, and wherein the cycle has a length equal to the stride length.

19. The non-transitory machine readable medium of claim 16, wherein the cycle has a length equal to a product of factors of the stride length.

20. The non-transitory machine readable medium of claim 14, wherein calculating the new predicate is performed by circuitry of the SIMD processor as a side effect of executing the instance of the instruction.

* * * * *